United States Patent
Cussat-Blanc et al.

(10) Patent No.: US 6,833,947 B2
(45) Date of Patent: Dec. 21, 2004

(54) OPTICAL FIBER TRANSMISSION SYSTEM

(75) Inventors: Sandrine Cussat-Blanc, Montlhery (FR); Jean-Pierre Hamaide, St. Germain les Arpajois (FR)

(73) Assignee: Alcatel, Paris (FR)

( * ) Notice: Subject to any disclaimer, the term of this patent is extended or adjusted under 35 U.S.C. 154(b) by 99 days.

(21) Appl. No.: 10/348,954

(22) Filed: Jan. 23, 2003

(65) Prior Publication Data

US 2003/0156784 A1 Aug. 21, 2003

(30) Foreign Application Priority Data

Feb. 21, 2002 (EP) ............................................. 02360069

(51) Int. Cl.$^7$ .......................... H01S 3/00; H04B 10/12; G02B 6/28
(52) U.S. Cl. ...................... 359/334; 359/341.3; 385/24
(58) Field of Search .............................. 359/341.3, 334; 385/24

(56) References Cited

U.S. PATENT DOCUMENTS

2004/0109230 A1 * 6/2004 Matsushita et al. ...... 359/341.3

FOREIGN PATENT DOCUMENTS

| EP | 0 268 523 B1 | 5/1988 |
|---|---|---|
| EP | 1 018 666 A1 | 7/2000 |
| EP | 1 164 668 A2 | 12/2001 |
| WO | WO 02/13423 A2 | 2/2002 |

OTHER PUBLICATIONS

Yoshihiro Emori and Shu Namiki; "State of the art in diode pumped Raman amplifiers" OMC1–3.

* cited by examiner

*Primary Examiner*—Brian Healy
*Assistant Examiner*—Michael P. Mooney
(74) *Attorney, Agent, or Firm*—Sughrue Mion, PLLC

(57) ABSTRACT

An optical fiber transmission system having Raman amplifier module for inputting a pumping signal into an optical fiber for stimulated Raman amplification of a first carrier signal. The Raman amplifier module includes a pump having two optical sources, wherein the first optical source emits a linear beam along a first polarization axis of polarization, and the second optical source emits another linear beam along a second polarization axis distinct from the first axis. The two beams are combined to for the pumping signal. The Raman amplifier module also includes a polarization tuning means arranged to superimpose in real time at least one of the polarization axes to a Polarization Dependant Loss axis.

15 Claims, 2 Drawing Sheets

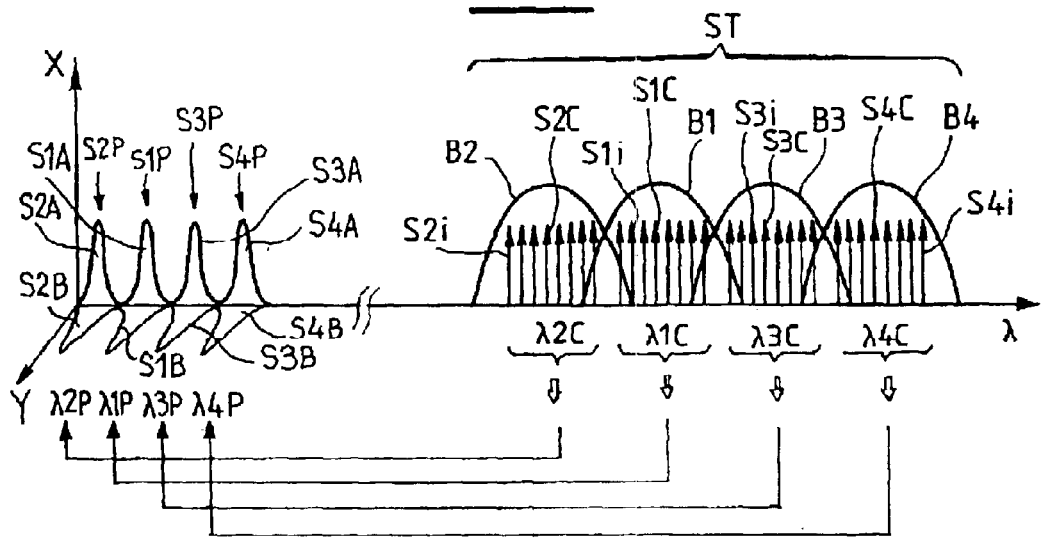
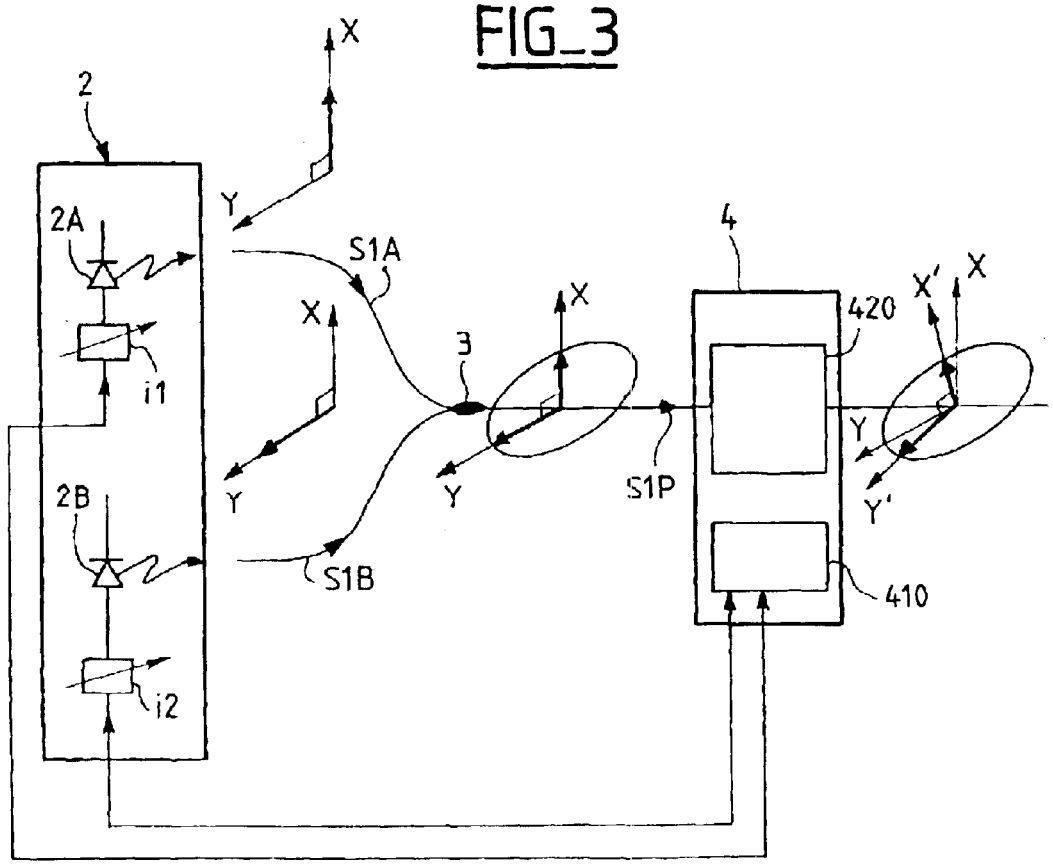

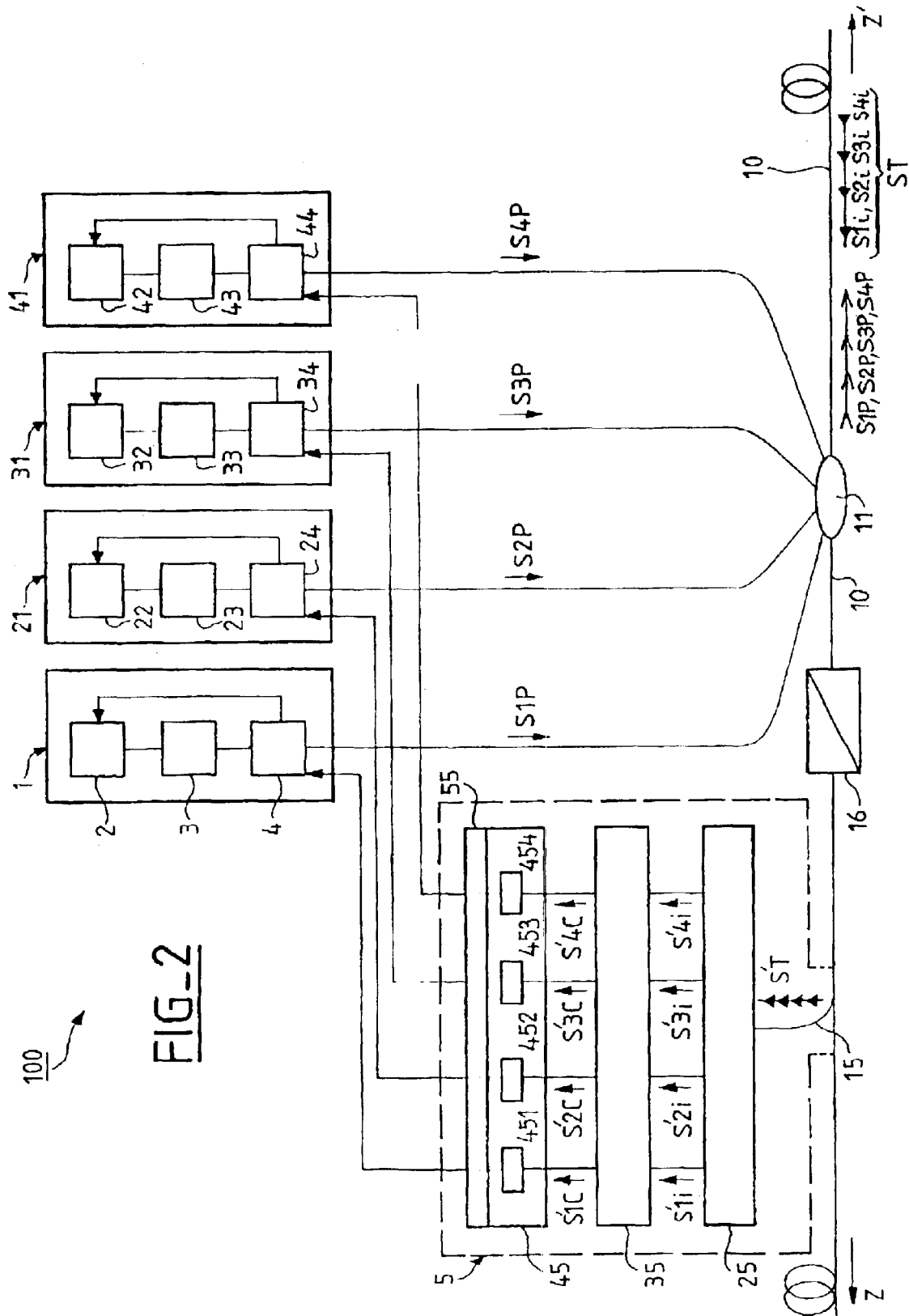

OPTICAL FIBER TRANSMISSION SYSTEM

The invention is bases on a priority application EP 02 360 069.5 which is hereby incorporated by reference.

FIELD OF THE INVENTION

The invention relates to optical fiber transmission systems.

BACKGROUND OF THE INVENTION

As is known, in fiber optic lines transmitting optical signals carrying information, Polarization Dependant Loss (PDL) namely quantifies the passive elements sensitivity to the state of polarization of the carrier signal. PDL, normally expressed in dB, has a given value for each passive element of the line and can be defined as 10 log(Tmax/Tmin) where T is the optical transmittance (or power) taken over the entire polarization-state space.

PDL is an undesirable phenomenon since it causes loss varying with the state of polarization of the carrier signal. The impact of PDL on network performance is increased signal distortion and consequently higher bit-error-rate (BER). Besides, PDL effect varies as a function of the wavelength of the carrier signal. In addition, as the state of polarization of the carrier signal evolves randomly with time, PDL effect leads to time-varying network performance.

PDL of passive elements is usually characterized as a localized phenomenon and depends namely on the technology and design of the elements. By way of example, elements like filters, multiplexers, demultiplexers or isolators lead to on negligible PDL at the end of a transmission line. Moreover, PDL can also occur for example at the interface between elements. Only some specific optical fibers (OF) are designed to have low PDL.

Furthermore, aging can significantly increase the PDL of the line Thus, in present lines, existing solutions do not allow to compensate for all kinds of PDL, as well as PDL occurring or varying in time.

An aspect of the present invention is to implement an optical fiber transmission system having at any time a very low PDL effect, at least for carrier signal(s) with wavelength (s) in a given spectral band included in the transmission band.

SUMMARY OF THE INVENTION

For this purpose, the invention provides an optical fiber transmission system for transmitting at least a first carrier signal with a wavelength in a first spectral band. The system includes an optical fiber, at least a first Raman amplifier module for launching into said optical fiber a first pumping signal at an appropriate wavelength for a stimulated Raman amplification of said first carrier signal. The first Raman amplifier module includes first pumping means with two optical sources. One optical source emits at the appropriate wavelength, a linear beam along a first axis of polarization, the other optical source emits, at the appropriate wavelength, a linear beam along a second axis of polarization distinct from said first axis.

The module further comprises first combination means arranged to combine the beams in order to provide said first pumping signal.

The first Raman amplifier module includes first polarization tuning means arranged to superimpose in real time at least one of the axes of polarization to a Polarization Dependant Loss (PDL) axis.

Raman amplification is classically used in ultra long transmission system for compensating attenuation occurring along the travel distance while lowering the amplified spontaneous noise. It is known that, in a Raman amplification, gain is varying with the state of polarization of the carrier signals, depending on the relative polarisation state between the carrier signal and the pumping signal. This phenomenon is called Polarization Dependent Gain (PDG).

The first Raman amplifier module of the invention enables to induce a controlled level of Raman PDG as a function of time. The Raman PDG substantially compensates the PDL occurring in the system before the Raman module that is on the emitter side, since the invention makes it possible to superimpose the first and/or the second axis of polarization of the first pumping signal to axis or axes "responsible" of PDL. Thus, an appropriate Raman amplification as a function of the state of polarization of the first carrier signal is provided.

By way of example, such Raman PDG can compensate the PDL of multiplexers, optical isolators and filters included in an Erbium Doped Fiber Amplifier (EDFA) disposed before such Raman module.

Besides, the first pumping signal of the invention only amplifies first carrier signals in a certain spectral band corresponding to the first spectral band of the invention. Thus, other carrier signals in second spectral band(s) included in the transmission band are not amplified. Moreover, amplified first carrier signals, located very near to the limits of the first spectral band, are less amplified by the first Raman module. Such non-amplified or less amplified carrier signals still suffer from the PDL effect. Two of the spectral bands can be chosen so as to include less amplified first carrier signal(s) to provide them a better amplification.

Advantageously, the system of the invention can further comprise at least a second Raman amplifier module for launching into the optical fiber a second pumping signal at an appropriate wavelength for a stimulated Raman amplification of a second carrier signal. The second Raman amplifier module is distinct from the first Raman amplifier module, and includes a second pumping means, a second combination means and a second polarization tuning means similar to the first polarization tuning means.

In this way, each spectral band of the transmission band can be associated to a dedicated Raman amplifier module used to correct PDL. Thus, the invention counteracts the variations of PDL with the wavelength.

In an embodiment of the invention, each of the polarization tuning means comprises power variation means arranged to vary the optical power of at least one of the optical sources.

PDL corrections are improved by properly adjusting the amplitude of at least one linear polarization.

With the configuration of the pumping means of the invention, the resulting polarization of each pumping signal can be:
  linear, for example if one of the sources is off,
  circular, for example if optical sources provide beams at
    a same level of optic power and with axes of polarization perpendicular to each other,
  or more broadly elliptic.

By way of example, one optical source can provide a beam with a variable power (from zero to a given maximal power) thanks to power variation means, while the other source provides a beam with a constant power (zero or a given value).

Another example is to have both optical sources providing beam with variable powers thanks to power variation means, with the second axis of polarization perpendicular to the first axis.

In all configurations of the invention, it is recommended to have means keeping the total optical power of the pumping signal constant in order to keep the optical output power of carrier signals constant.

Preferably, each source can be chosen among power adjustable laser diode and a power adjustable fiber laser.

Power adjustment of such sources is performed through electrical voltage or current variations.

In an embodiment of the invention, each of the polarization tuning means comprises rotation means arranged to rotate in real time at least one of the axes of polarization.

In this way, for example, the first axis of polarization and/or the second axis of polarization can be rotated, independently or together, providing PDG counter-acting PDL.

Preferably, each of the rotation means of the invention can comprise at least a tunable Pockels cell tuned by a variable voltage.

The variable voltage induces birefringence in the Pockels cell, leading to axes rotation.

Two Pockels cells can be located near the optical sources before the combination of the linear beams or one Pockels cell can be located after the combination of the linear beams in the opposite side of optical sources. Advantageously, the system of the invention can further comprise feedback means controlling in real time each of said polarization tuning means.

Such feedback means make a diagnostic of the PDL corrections to apply for each group of carrier signals and thus command each of the polarization tuning means to adjust properly the amplitude and the direction of at least one of the linear polarization of beams.

To this end, the feedback means of the invention can comprise:
  extraction means arranged to pick up a fraction of at least the first carrier signal,
  selection means arranged to select at least a representative extracted carrier signal per spectral band,
  analysis means arranged to analyze the sum of PDL effect and PDG effect on said representative extracted carrier signal,
  command means arranged to master in real time each of the polarization tuning means.

The analysis means give access to the global effect of PDL and PDG, so that the latter is adjusted to cancel the former (PDL+PDG=0).

The representative carrier signal can be for example, the signal having the central wavelength in its spectral band and even a group of signals.

With the increased rate of information transmitted, an optical fiber transmission system is generally design to transmit DWDM (Dense Wavelength Division Multiplexing) carrier signals in a very large transmission band.

As carrier signals can be multiplexed, preferably the feedback means of the invention can comprise separation means arranged to separate the multiplexed extracted carrier signals.

Besides, the choice of analysis means depends on the state of polarization of the carrier signals, which can be scrambled signals, having adjacent carrier signals with a same or a crossed polarization.

The analysis means of the invention can be chosen from one or more from the following means: photodiodes, power spectrum analyzers and DOP measuring means.

A transmission system of the invention can comprise low frequency polarization scrambling means. Therefore, when the sum PDL+PDG differs from zero, there is a temporal modulation of carrier signals at the frequency of the scrambling (typically below 100 MHz). As the period of the scrambling is higher than the response time of photodiodes (~10 ns), photodiodes can be used to detect time variations of each representative signal. Thus, until these variations become substantially equal to zero, command means of the invention master each of the polarization tuning means.

A transmission system of the invention can transmit adjacent carrier signals having crossed polarization. When the sum PDL+PDG is different from zero, adjacent crossed signals do not have the same level of optical power. Therefore, power spectrum analyzers of the invention give information on the global effect of PDL and PDG.

The degree of polarization (DOP) of a carrier signal shows to what extent this signal is polarized. A transmission system of the invention can comprise low or high frequency polarization scrambling means and/or transmit adjacent carrier signals having crossed polarization. Therefore, when the sum PDL+PDG is different from zero, the DOP of carrier signal has a non-zero value. DOP measuring means of the invention can be used to detect this DOP variation for each representative signal. Thus, until this variation becomes substantially equal to zero, command means of the invention master each of the polarization tuning means.

Similarly, when adjacent carrier signals have parallel polarizations, DOP measuring means can be used to detect the DOP variation for each representative signal, initially equal to 1. Thus, until this variation becomes substantially equal to zero, command means of the invention master each polarization tuning means.

More broadly, an optical fiber transmission system can include several group of Raman amplifier modules associated with feedback means, for example repeated periodically in the fiber system in order to correct the accumulated PDL when needed.

BRIEF DESCRIPTION OF THE DRAWINGS

Other characteristics and advantages of the invention will appear on reading the following description of a preferred embodiment of the invention, given by way of example and with reference to the accompanying drawings, in which:

FIG. 1 is a diagram showing the spectrum of carrier signals transmitted in a preferred embodiment of an optical fiber transmission system of the invention and also showing the characteristics of pumping signals;

FIG. 2 is a diagrammatic representation of the optical fiber transmission system transmitting carrier signals of FIG. 1;

FIG. 3 is a diagrammatic representation of the first Raman amplifier module of FIG. 2.

DETAILED DESCRIPTION OF THE INVENTION

FIG. 1 is a diagram showing the spectrum of carrier signals transmitted in a preferred embodiment of an optical fiber transmission system of the invention and also showing the characteristics of pumping signals.

An optical fiber transmission system of the invention transmits DWDM signals. Each resulting carrier signal ST contains:
  first multiplexed carrier signals (all referenced S1$i$) having wavelengths in a first spectral band B1 for example of 5 nm bandwidth and namely a central carrier signal S1C with a central carrier wavelength λ1C, second multiplexed carrier signals (referenced S2$i$ or S3$i$ or S4$i$ as a function of spectral bonds) having wavelengths in spectral bands B2, B3, B4 for example of 5 nm bandwidth and distinct from the first band B1, and namely a central carrier signal S2C to S4C with a central carrier wavelength λ2C to λ4C.

Spectral bands B1 to B4 are included in a transmission band such as C band (1530 nm–1560 nm) or C+L band (1530 nm–1610 nm). By way of example, each carrier signal S1$i$ to S4$i$ has adjacent carrier signals with a crossed polarization.

Besides, spectral bands B1 to B4 are defined as Raman bands of several Raman amplifier modules. Some carrier signals belong to two spectral bands, one of them corresponds to a higher Raman amplification. FIG. 1 also shows the characteristics of pumping signals S1P to S4P each formed by two beams at appropriate wavelengths λ1P to λ4P for example inferior by 100 nm to each respective central carrier wavelength λ1C to λ4C for Raman amplification. A linear beam S1A to S4A is along a first axis of polarization X, another linear beam S1B to S4B is along a second axis of polarization Y perpendicular to axis X. For a simplified representation each couple of beams is associated with the same couple of axis X, Y.

FIG. 2 is a diagrammatic representation of a preferred embodiment of an optical fiber transmission system of the invention 100 containing signals of FIG. 1. The following description is made in combination with FIG. 3.

The system 100 includes an optical fiber 10, a first Raman amplifier module 1 for launching into the optical fiber 10 the first pumping signal S1P in the optical fiber 10 for example in the opposite direction Z' with respect to the propagation direction Z of the first carrier signals S1$i$. The first amplifier module 1 includes:

first pumping means 2 comprising two optical sources (see FIG. 3), the first optical source 2A emitting a linear beam S1A along the axis of polarization X, the second optical source 2B emitting a linear beam S1B along the axis Y, first combination means 3 arranged to combine these beams S1A, S1B and providing the first pumping signal S1P, first polarization tuning means 4 arranged to superimpose in real time the two axes of polarization X, Y to PDL axis linear polarization (not shown).

As shown in FIG. 3, first polarization tuning means 4 comprise:

power variation means 410 arranged to vary optical power of the optical sources 2A, 2B, each source being for example a power adjustable laser diode with a given current i1, i2, the power variation being performed by a current variation, rotation means such as a tunable Pockels cell 420 which is tuned by a variable voltage (not shown) and arranged to rotate in real time both axes of polarization X and Y becoming rotated axes X', Y' respectively.

The system 100 further comprises three second Raman amplifier modules 21, 31, 41 for launching into the optical fiber 10 the second pumping signals S2P to S4P at an appropriate wavelength for a stimulated Raman amplification of the second carrier signals S2$i$, S3$i$, S4$i$. Each Raman amplifier module 21, 31, 41 includes second pumping means 22, 32, 42, comprising two power adjustable laser diodes (not shown), second combination means 23, 33, 43 and second polarization tuning means 24, 34, 44 comprising power variation means (not shown) and rotation means (not shown). These means have the same function as the first elements already described.

The system 100 further comprises feedback means 5 controlling in real time each of the polarization tuning means 4, 24, 34, 44 and including:

extraction means 15 disposed, along the direction Z, after the launch location 11 of the associated pumping signal S1P to S4P and arranged to pick up a fraction of the extracted resulting carrier signal S'T, separation means 25 arranged to separate such extracted multiplexed carrier signal S'1$i$ to S'4$i$, selection means 35 arranged to select at least a representative extracted carrier signal per spectral band, for example extracted central carrier signals S'1C to S'4C, analysis means 45 such as DOP measuring means or power spectrum analyzers 451 to 454 arranged to analyze the sum of PDL effect and PDG effect on each representative extracted carrier signal S'1C to S'4C, command means 55 arranged to master in real time each of the polarization tuning means 4, 24, 34, 44.

Moreover, an isolator 16 is disposed between extraction means 15 and launch location 11.

Furthermore, the transmission system 100 can include other similar groups of Raman amplifier modules associated with feedback means (not shown), for example repeated periodically in the fiber system 100 in order to correct the accumulated PDL when needed. Moreover, if there is no PDL in a portion of the transmission system 100 including a Raman amplifier module associated with feedback means of the invention, thus those means of the invention are able to cancel the PDG effect.

Of course, the present invention is not limited to the examples and the embodiment described and shown, and the invention can be the subject to numerous variations that are available to the person skilled in the art.

A representative signal can be a non central carrier signal.

Moreover, as several signals can represent each spectral band, analysis means can comprise more than one DOP measuring means or one photodiode per spectral bond.

Each pumping signal can be launched in the opposite direction and/or in the same direction with respect to the propagation direction of carrier signals.

What is claimed is:

1. An optical fiber transmission system comprising a first Raman amplifier module for launching into an optical fiber a first pumping signal for a stimulated Raman amplification of a first carrier signal having a wavelength in a first spectral band, said first Raman amplifier module comprising:

first pumping means comprising a first optical source that emits a first linear beam along a first axis of polarization, and a second optical source that emits a second linear beam along a second axis of polarization distinct from said first axis, and first combination means arranged to combine said first and second beams in order to provide said first pumping signal, wherein said first Raman amplifier module comprises first polarization tuning means arranged to superimpose in real time at least one of said axes of polarization to a Polarization Dependant Loss axis.

2. The optical fiber transmission system according to claim 1, further comprising a second Raman amplifier module for launching into said optical fiber a second pumping signal for a stimulated Raman amplification of a second carrier signal having a wavelength in a second spectral band distinct from said first band, said second Raman amplifier module comprising:

second pumping means comprising a first optical source that emits a first linear beam along said first axis of polarization, and a second optical source emits a second linear beam along said second axis of polarization, and second combination means arranged to combine said first and second beams from said second pumping means in order to provide said second pumping signal, wherein said second Raman amplifier module comprises second polarization tuning means arranged to superimpose in real time at least one of said axes of polarization to said Polarization Dependant Loss axis.

3. The optical fiber transmission system according to claim 1, wherein said polarization tuning means comprises power variation means arranged to vary optical puissance of at least one of said optical sources.

4. The optical fiber transmission system according to claim 3, wherein each optical source comprises at least one of a power adjustable laser diode and a power adjustable fiber laser.

5. The optical fiber transmission system according to claim 1, wherein said polarization tuning means comprises rotation means arranged to rotate in real time at least one of said axes of polarization.

6. The optical fiber transmission system according to claim 5, wherein said rotation means comprise a tunable Pockels cell tuned by a variable voltage.

7. The optical fiber transmission system according to claim 1, further comprising feedback means controlling said polarization tuning means in real time.

8. The optical fiber transmission system according to claim 7, wherein the feedback means comprise:

extraction means that extract a portion of said first carrier signal, selection means arranged to select a representative extracted carrier signal per spectral band, analysis means arranged to analyze the sum of a polarization dependent loss effect and a polarization dependent gain effect on said representative extracted carrier signal, and command means arranged to control in real time said polarization tuning means.

9. The optical fiber transmission system according to claim 8, wherein said analysis means comprises at least one of a photodiode, power spectrum analyzer and DOP measuring means.

10. The optical fiber transmission system according to claim 2, wherein each of said polarization tuning means comprises rotation means arranged to rotate in real time at least one of said axes of polarization.

11. The optical fiber transmission system according to claim 10, wherein said rotation means comprise a tunable Pockels cell tuned by a variable voltage.

12. The optical fiber transmission system according to claim 2, further comprising feedback means controlling each of said polarization tuning means in real time.

13. The optical fiber transmission system according to claim 12, wherein the feedback means comprise:

extraction means that extract a portion of said first and second carrier signals, selection means arranged to select a representative extracted carrier signal per spectral band, analysis means arranged to analyze the sum of a polarization dependent loss effect and a polarization dependent gain effect on each of said representative extracted carrier signal, and command means arranged to control in real time each of said polarization tuning means.

14. The optical fiber transmission system according to claim 13, wherein said carrier signals are multiplexed, and said feedback means comprise separation means arranged to separate multiplexed extracted carrier signals.

15. The optical fiber transmission system according to claim 13, wherein said analysis means comprise at least one of photodiodes, power spectrum analyzers and DOP measuring means.

* * * * *